(12) United States Patent
Clark et al.

(10) Patent No.: US 11,228,614 B1
(45) Date of Patent: Jan. 18, 2022

(54) AUTOMATED MANAGEMENT OF SECURITY OPERATIONS CENTERS

(71) Applicant: Amazon Technologies, Inc., Seattle, WA (US)

(72) Inventors: Jessica Erin Clark, Seattle, WA (US); Matthew Ryan Jezorek, Maple Valley, WA (US); Matthew Michael Sommer, Issaquah, WA (US)

(73) Assignee: Amazon Technologies, Inc., Seattle, WA (US)

( * ) Notice: Subject to any disclaimer, the term of this patent is extended or adjusted under 35 U.S.C. 154(b) by 314 days.

(21) Appl. No.: 16/043,817

(22) Filed: Jul. 24, 2018

(51) Int. Cl.
*H04L 29/06* (2006.01)
*G06Q 10/06* (2012.01)

(52) U.S. Cl.
CPC ...... *H04L 63/20* (2013.01); *G06Q 10/063114* (2013.01); *H04L 63/302* (2013.01)

(58) Field of Classification Search
CPC ................. H04L 63/20; H04L 63/302; G06Q 10/063114
USPC ........................................................... 726/1
See application file for complete search history.

(56) References Cited

U.S. PATENT DOCUMENTS

| | | | | |
|---|---|---|---|---|
| 9,516,053 | B1* | 12/2016 | Muddu | H04L 63/1433 |
| 9,652,972 | B1* | 5/2017 | Lobo | H04L 41/0609 |
| 2005/0204404 | A1* | 9/2005 | Hrabik | H04L 63/20 |
| | | | | 726/22 |
| 2011/0282508 | A1* | 11/2011 | Goutard | H04L 63/20 |
| | | | | 700/293 |
| 2012/0069131 | A1* | 3/2012 | Abelow | G06Q 10/067 |
| | | | | 348/14.01 |
| 2013/0298230 | A1* | 11/2013 | Kumar | H04L 63/1425 |
| | | | | 726/22 |
| 2014/0201836 | A1* | 7/2014 | Amsler | H04L 63/20 |
| | | | | 726/23 |
| 2015/0033305 | A1* | 1/2015 | Shear | G06F 21/64 |
| | | | | 726/6 |
| 2015/0207813 | A1* | 7/2015 | Reybok | H04L 63/145 |
| | | | | 726/22 |
| 2016/0021056 | A1* | 1/2016 | Chesla | H04L 63/14 |
| | | | | 726/11 |
| 2016/0210578 | A1* | 7/2016 | Raleigh | H04W 72/0453 |

(Continued)

OTHER PUBLICATIONS

Security Operations Centers for Information Security Incident Management Natalia Miloslavskaya IEEE 4th International Conference on Future Internet of Things and cloud. pp. 1-8, 2016 (Year: 2016).*

(Continued)

*Primary Examiner* — Samson B Lemma
*Assistant Examiner* — Mohammad S Shams
(74) *Attorney, Agent, or Firm* — Thomas | Horstemeyer, LLP

(57) ABSTRACT

Disclosed are various embodiments providing automated management of security operations centers. In one embodiment, a correlation and decision engine correlates event data generated by a plurality of monitoring services with a plurality of alerts generated by a plurality of threat intelligence services. The engine then adjusts at least one rule of one or more threat intelligence services with respect to at least one event based at least in part on a corresponding frequency of at least one of the plurality of alerts meeting a threshold, where the adjusted alert(s) are associated with the event(s).

20 Claims, 5 Drawing Sheets

(56) References Cited

U.S. PATENT DOCUMENTS

| | | | | |
|---|---|---|---|---|
| 2016/0294854 | A1* | 10/2016 | Parthasarathi | H04L 63/20 |
| 2016/0330219 | A1* | 11/2016 | Hasan | H04L 63/20 |
| 2016/0366131 | A1* | 12/2016 | Kostadinov | H04L 63/0428 |
| 2017/0126703 | A1* | 5/2017 | Ujiie | H04L 63/08 |
| 2017/0171231 | A1* | 6/2017 | Reybok, Jr. | H04L 63/14 |
| 2017/0357982 | A1* | 12/2017 | Barday | G06Q 10/06 |
| 2017/0359306 | A1* | 12/2017 | Thomas | H04L 63/10 |
| 2018/0013768 | A1* | 1/2018 | Hunt | H04L 63/1408 |
| 2018/0027006 | A1* | 1/2018 | Zimmermann | G06F 9/46 726/11 |
| 2018/0191771 | A1* | 7/2018 | Newman | H04L 63/1433 |
| 2018/0219879 | A1* | 8/2018 | Pierce | H04L 63/1416 |
| 2019/0207968 | A1* | 7/2019 | Heckman | H04L 63/1425 |
| 2020/0004957 | A1* | 1/2020 | Chamaraju | G06N 7/005 |
| 2020/0012990 | A1* | 1/2020 | Bhargava | G06Q 10/063114 |
| 2020/0076835 | A1* | 3/2020 | Ladnai | H04L 63/1416 |

OTHER PUBLICATIONS

Ubiquitous Connectivity and Threats: Architecting The Next Generation Cyber Security Operations Dennis H. McCallam, Preston D. Frazier, Risa Savold The 7th Annual IEEE International Conference on Cyber Technology in Automation, Control and Intelligent Systems. Jul. 31-Aug. 4, 2017. pp. 1-4 (Year: 2017).*

Classification of Security Operation Centers Pierre Jacobs, Alapan Arnab, Barry Irwin Department of Computer Science, Rhodes University, Grahamstown, South Africa. Aug. 14, 2013. pp. 1-7 (Year: 2013).*

* cited by examiner

AUTOMATED MANAGEMENT OF SECURITY OPERATIONS CENTERS

BACKGROUND

Security operations centers are facilities responsible for monitoring, assessing, and protecting against threats to computer systems and networks. Various services may be employed by a security operations center, such as monitoring services to monitor system and network activity, detection services to analyze events, and threat response services to defend against identified threats. Threats may include denial of service attacks, malware deployments, brute force login attempts, exploits of known and unknown software vulnerabilities, actions of rogue employees, ransomware, and other threats.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1:
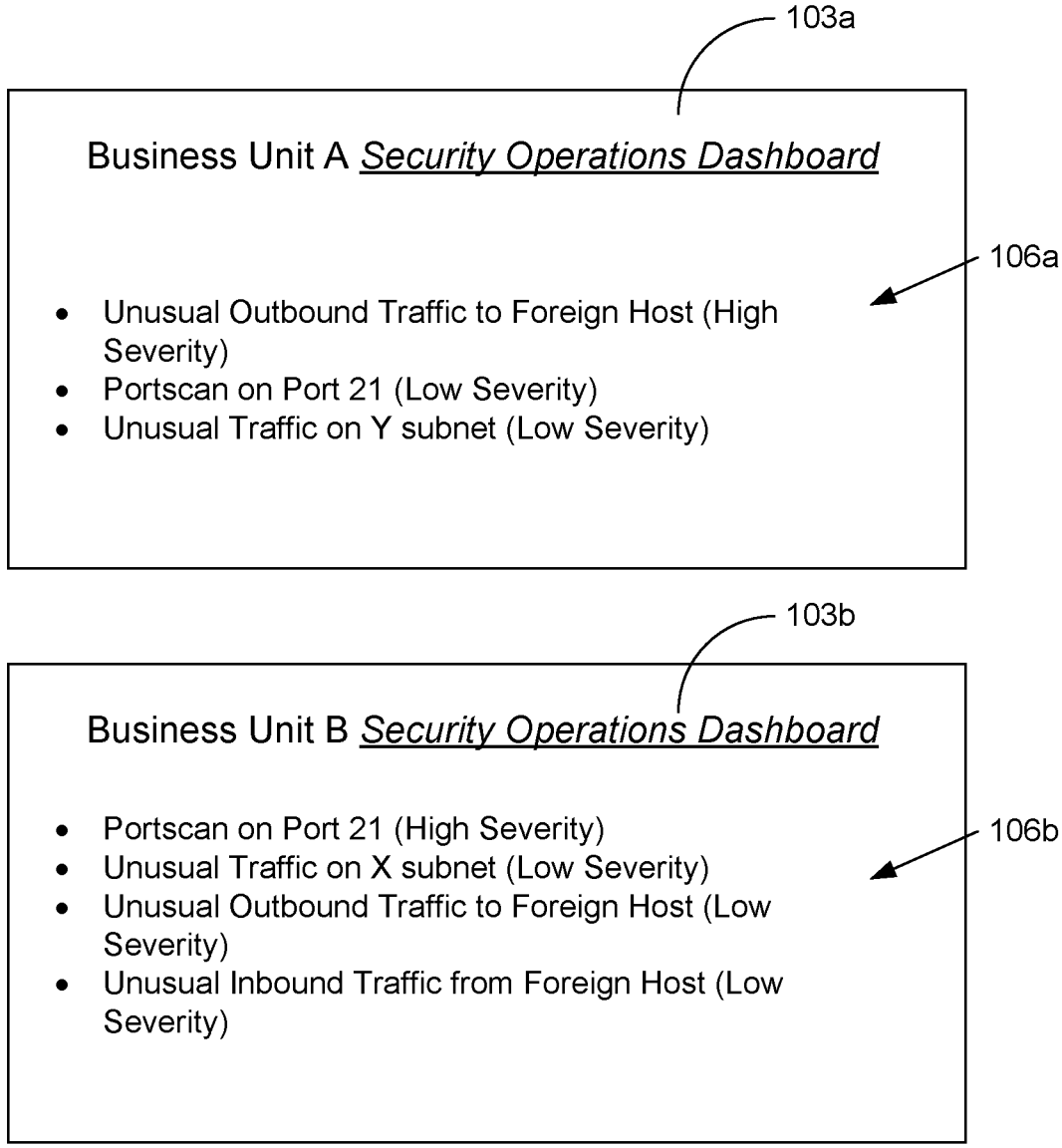
FIG. 1 is a drawing of an example scenario involving two security environments according to various embodiments of the present disclosure.

The present application relates to automated management of security operations centers. A large organization or enterprise may have a number of different units or constituent entities that manage distinct types of information technology systems. For example, an organization may have an electronic commerce unit, a financial management unit, a media streaming unit, a utility computing unit, and other units. The different units may provide distinct services internally and to the public, perhaps using different computing infrastructure. Consequently, the security threats faced by the units may differ. Additionally, in some cases, the different units may have their own information security personnel.

Because the different units in a large organization may face different security threats or may need to respond to the same threats in different ways, a single monolithic security operations center for the organization would be suboptimal. For example, a unit in charge of managing desktops may be more concerned with malware deployments, while a unit in charge of financial information management may be more concerned with detecting data exfiltration. Likewise, availability-related threats may be more significant to a utility computing unit than to the financial information management unit. However, establishing and maintaining security operations centers for different units is a costly endeavor, requiring much investment in staffing to perform the manual configuration and tuning.

Various embodiments of the present disclosure leverage machine learning to automate management of security operations centers. A correlation and decision engine may examine event data from many different types of monitoring sources for an organizational unit and correlate the event data with threats identified via a threat intelligence service. The correlation and decision engine may further correlate the identified threats with remediation actions that are recommended and ultimately implemented through a remediation service. The correlation and decision engine may be initially trained by baseline data from past performance and then trained on an on-going basis. The correlation and decision engine may then be used to customize the operation of the components of a security operation center for the organizational unit, including, but not limited to, customized event detection, customized scoring of events, and customized remediation.

As one skilled in the art will appreciate in light of this disclosure, certain embodiments may be capable of achieving certain advantages, including some or all of the following: (1) improving computer network security by facilitating deployment of security operations centers that are automatically customized and tuned for particular organizational units, (2) improving flexibility for security operations centers so that events and alerts may be given different priority levels or severity levels based on surrounding context of the organizational unit, (3) improving flexibility for security operations centers so that rule sets can be automatically updated as new vulnerabilities and forms of attacks are discovered, (4) improving the operation of the computer by decreasing network services downtime due to security threats, and so forth.

Turning now to FIG. 1, shown is a drawing of an example scenario 100 involving two security environments for different business units according to the principles of the present disclosure. In the scenario 100, a business unit A has a security operations dashboard 103a, and a business unit B has a security operations dashboard 103b. Each of the security operations dashboards 103 may display a list of alerts 106a, 106b pertaining to the computing systems and networks of the particular business unit.

For this example, assume that monitoring services for each respective business unit A or B are detecting similar events on the network. However, according to the principles of the present disclosure, the alerts 106a and 106b differ and may be presented differently. In both cases, a "portscan on port 21" is a generated alert, but for the business unit A, it is listed as low severity, while for the business unit B, it is listed as high severity. This is due to a modification of rules respecting the threat intelligence system for the business units A and B. Either the rules for business unit A may be modified from the norm to lower the severity level for business unit A for this alert, or the rules for business unit B may be modified from the norm to raise the severity level for business unit B for this alert. For example, the alert may occur very frequently for business unit A that it is demoted to a lower severity, or the alert may occur very infrequently for business unit B that it is promoted to a higher severity.

In addition to raising or lowering a severity level, rules modification may cause some alerts to be generated or not generated depending on the business unit and the computing resources it uses. In this case, an alert for "unusual inbound traffic from foreign host" is generated only for business unit B but not for business unit A, in spite of similar network traffic patterns. This situation might be due to business unit A hosting publicly available services, such as web servers, such that spikes in foreign inbound traffic might be expected from time to time. By contrast, business unit B may correspond to a domestic financial processing service that would not be expected to have foreign inbound traffic.

As will be described, the system may cause events to be detected or not detected, alerts to be generated or not generated, scores or priorities for alerts to be altered, or remedial actions to be recommended, taken, or not taken, all differently from a default behavior (or default organization-wide behavior) of a security operations center. In the following discussion, a general description of the system and its components is provided, followed by a discussion of the operation of the same.

Figure 2:
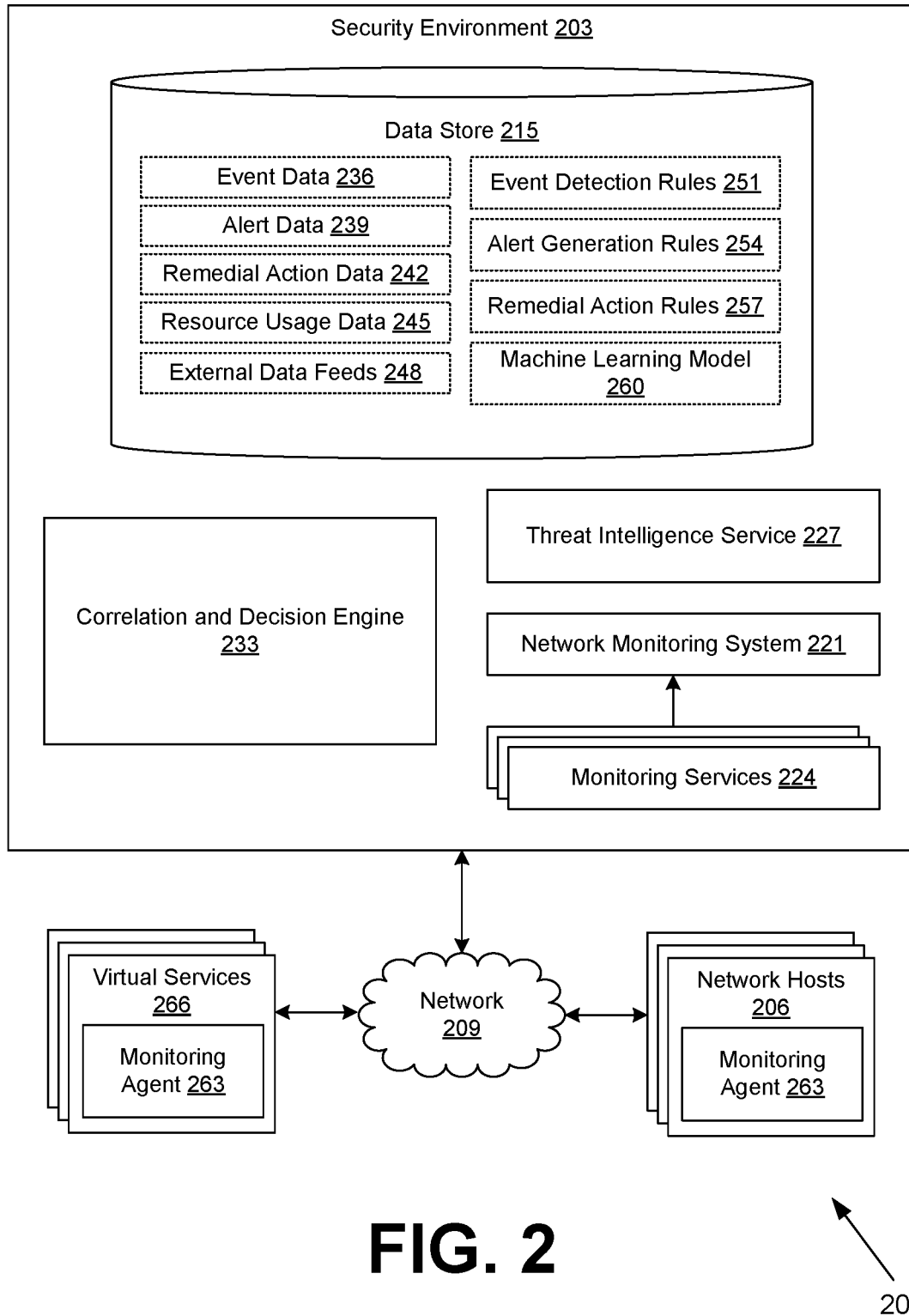
FIG. 2 is a schematic block diagram of a networked environment according to various embodiments of the present disclosure.

With reference to FIG. 2, shown is a networked environment 200 according to various embodiments. The networked environment 200 includes a security environment 203 and a plurality of network hosts 206, which are in data communication with each other via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The security environment 203 may comprise, for example, a server computer or any other system providing computing capability. Alternatively, the security environment 203 may employ a plurality of computing devices that may be arranged, for example, in one or more server banks or computer banks or other arrangements. Such computing devices may be located in a single installation or may be distributed among many different geographical locations. For example, the security environment 203 may include a plurality of computing devices that together may comprise a hosted computing resource, a grid computing resource, and/or any other distributed computing arrangement. In some cases, the security environment 203 may correspond to an elastic computing resource where the allotted capacity of processing, network, storage, or other computing-related resources may vary over time.

Various applications and/or other functionality may be executed in the security environment 203 according to various embodiments. Also, various data is stored in a data store 215 that is accessible to the security environment 203. The data store 215 may be representative of a plurality of data stores 215 as can be appreciated. The data stored in the data store 215, for example, is associated with the operation of the various applications and/or functional entities described below.

The components executed on the security environment 203, for example, include a network monitoring system 221, a plurality of monitoring services 224, a threat intelligence service 227, a correlation and decision engine 233, and other applications, services, processes, systems, engines, or functionality not discussed in detail herein. The network monitoring system 221 is executed to monitor various aspects of operation of the network 209 and/or the network hosts 206. In this regard, the network monitoring system 221 may function to aggregate streams of event data generated by the monitoring services 224. For example, one monitoring service 224 may track network connections through a particular firewall on the network 209, while another monitoring service 224 may track log-ins on one or more network hosts 206. Monitoring services 224 may provide network connection pair data, actual packet data from the network 209, sniffed packet headers, file hashes, and/or other event data.

The network monitoring system 221, through aggregation, may summarize or condense the streams of event data from the monitoring services 224 into fewer streams of event data.

The threat intelligence service 227 may include an intrusion detection system. To this end, the threat intelligence service 227 may be executed to process the streams of event data from the network monitoring system 221 through a rule-based analysis to generate alerts. In this rule-based analysis, the threat intelligence service 227 looks for anomalies in the streams of event data that are correlated to known indicators of compromise. As an example, the threat intelligence service 227 may identify outbound network traffic to an internet protocol (IP) address corresponding to a known malware command and control network. As another example, the threat intelligence service 227 may identify inbound network traffic from an IP address corresponding to a known botnet. As still another example, the threat intelligence service 227 may identify an installation of files on network hosts 206 that correspond to known malware files.

The threat intelligence service 227 may further include logic executed to facilitate management of security incidents by human users who are security administrators. In this regard, the threat intelligence service 227 may include task tracking and ticket management functionality. The threat intelligence service 227 may send emails, text messages, pages, voice messages, or other communications to alert security administrators to urgent incidents. The threat intelligence service 227 can include functionality to score incidents according to severity, record remedial actions taken, escalate to other users, and mark tasks as resolved. The threat intelligence service 227 may generate user interfaces such as network pages, mobile application screens, and so on, that correspond to administrative dashboards.

Also, the threat intelligence service 227 may cause one or more automated remedial actions to be performed in response to an alert. Such actions may include configuring a router or firewall to remove access to the network 209 for one or more network hosts 206, quarantining suspicious files on a network host 206 (e.g., so that the files cannot easily be executed), configuring a router or firewall to block inbound or outbound network access for one or more network addresses or ports, or other actions.

The correlation and decision engine 233 is executed to automate deployment and configuration of a security environment 203 for a given organizational unit or entity. To this end, the correlation and decision engine 233 may examine baseline data for the particular organizational unit and/or baseline data for multiple other organizational units, and to correlate alerts generated by the threat intelligence service 227 with events generated through the network monitoring system 221. Data for similar organizational units with similar computing resource usage (e.g., similar network services, similar computing infrastructure) may be correlated as a baseline.

The correlation and decision engine 233 may then adjust rules controlling the generation of alerts by the threat intelligence service 227 such that certain alerts are generated or not generated, or that the scoring in terms of threat and/or severity level for an alert may be adjusted. Additionally, the correlation and decision engine 233 may adjust rules controlling generation of events by the network monitoring system 221 from the monitoring data provided by the monitoring services 224, and/or adjust rules controlling generation of remedial action recommendations or automated implementation of remedial actions. As additional data is gathered (e.g., as the security environment 203 continues operations under the adjusted rules, or as administrators make manual adjustments), the feedback may be incorporated by the correlation and decision engine 233, and the rules may be further adjusted.

It is noted that the security environment 203 may be operated as a service on behalf of external entities and organizational units. In such cases, the monitoring services 224 may be executed on external systems and communicate with the security environment 203 via the network 209.

The data stored in the data store 215 includes, for example, event data 236, alert data 239, remedial action data 242, resource usage data 245, external data feeds 248, event detection rules 251, alert generation rules 254, remedial action rules 257, a machine learning model 260, and potentially other data. The event data 236 includes a stream of events generated by the network monitoring system 221 based upon monitoring data from the monitoring services 224.

The alert data 239 includes alerts generated by the threat intelligence service 227 as a consequence of a rule-based analysis of the event data 236. Alerts may be associated with varying scores, such as relative priorities and relative severity levels (e.g., low, medium, or high), which can affect how the alerts are presented to users and/or whether remedial actions are automatically implemented.

The remedial action data 242 includes remedial actions recommended or automatically implemented by the threat intelligence service 227 based upon the generated alerts. The remedial action data 242 may also track manually initiated remedial actions that are initiated by users in response to alerts.

The resource usage data 245 may include data tracking computing resources used or types of computing resources used by an organizational unit. To this end, the resource usage data 245 may include an automatically generated inventory of computing resources utilized by the organizational unit (e.g., determined through a simple network management protocol (SNMP) inventory or by querying a service through an application programming interface (API)). Alternatively, the resource usage data 245 may include spreadsheets, flat text configuration files, extensible markup language (XML) configuration files, reference models for hosted services, or other manually curated data describing the inventory of computing resources utilized by the organizational unit. In some cases, the resource usage data 245 may be generated through the analysis of logical network diagrams, which may be in any diagramming format.

The computing resources described in the resource usage data 245 may include network 209 resources and network host 206 resources, including both hardware and software resources. In some implementations, rather than tracking a specific inventory, the resource usage data 245 may describe the computing resources utilized by the organizational unit in terms of a resource usage classification (e.g., end user desktops, financial information management services, external web servers, utility computing servers, and so on). The resource usage data 245 may be used by the correlation and decision engine 233 in order to cluster event, alert, and remedial action data by like organizational units.

The external data feeds 248 are obtained from third-party services and provide threat intelligence that may be incorporated in the threat intelligence service 227. For example, the external data feeds 248 may include known indicators of compromise corresponding to structured information that describes one or more items of data or conditions that may be used to identify a potential security compromise. The known indicators of compromise may include, for example, uniform resource locators (URLs), Internet protocol (IP) addresses, or domain names that are accessed by malware programs, file signatures corresponding to malware files, names of processes corresponding to malware processes, kernel modules corresponding to malware, and so on.

The event detection rules 251 correspond to rules that control how the network monitoring system 221 is to detect and generate events from the monitoring data obtained from the monitoring services 224. For example, the event detection rules 251 may specify thresholds for events to be generated, or that a combination of conditions should be present.

The alert generation rules 254 correspond to rules that control how the threat intelligence service 227 recognizes threat conditions from the event data 236 and generates alerts. The alert generation rules 254 may be based at least in part on known indicators of compromise, which may be manually curated, automatically determined, or imported from external data feeds 248. The alert generation rules 254 may also control scoring of alerts, such as assigning priority levels or severity levels to the alerts, which may in turn control how administrative users are notified or whether remedial actions are automatically taken.

The remedial action rules 257 are rules that control how the threat intelligence service 227 recommends or automatically implements remedial actions. A given alert may have one more recommended remedial actions, such as disabling or limiting network access of a network host 206, updating a firewall rule, rotating security credentials, adding network addresses to block lists, and so forth.

The machine learning model 260 is developed by the correlation and detection engine 233 based at least in part on baseline empirical data and manually curated data in order to adjust one or more of the event detection rules 251, the alert generation rules 254, or the remedial action rules 257, which may in turn affect the operation of the network monitoring system 221 and/or the threat intelligence service 227. Moreover, the machine learning model 260 may be continually updated and refined based upon the continued operation of the threat intelligence service 227 and the network monitoring system 221 and manual interventions in those systems.

The network hosts 206 are representative of a plurality of client or server devices that may be coupled to the network 209. The network hosts 206 may comprise, for example, a processor-based system such as a computer system. Such a computer system may be embodied in the form of a server, a router, a firewall, a desktop computer, a laptop computer, personal digital assistants, cellular telephones, smartphones, set-top boxes, music players, web pads, tablet computer systems, game consoles, electronic book readers, voice interface devices, or other devices.

The network hosts 206 may execute a monitoring agent 263 configured to monitor operation of the respective network host 206 and report monitoring data back to the monitoring services 224 or the network monitoring system 221. The monitoring agent 263 may be remotely configured to scan local storage of the network host 206 for malware signatures, scan executing processes for malware signatures, or perform other scanning functions. The monitoring agent 263 may also monitor resource usage associated with the network host 206, including network traffic, processor usage, memory usage, data storage, and so on.

Virtual services 266 may additionally be coupled to the network 209 and security managed by the security environment 203. As compared to the network hosts 206, the virtual services 266 may be deployed in a utility computing environment, where the computing hardware is not controlled or owned by the organizational unit that operates the virtual service 266. In some cases, the organization unit operating the virtual service 266 has access to a virtual machine instance but not to the underlying hypervisor system. In other cases, the virtual service 266 may simply be a computation service for which the organizational unit has no access to an operating system. In some embodiments, the virtual services 266 may execute a monitoring agent 266. As will be used herein, the term network host 206 may include the virtual services 266.

Figure 3:
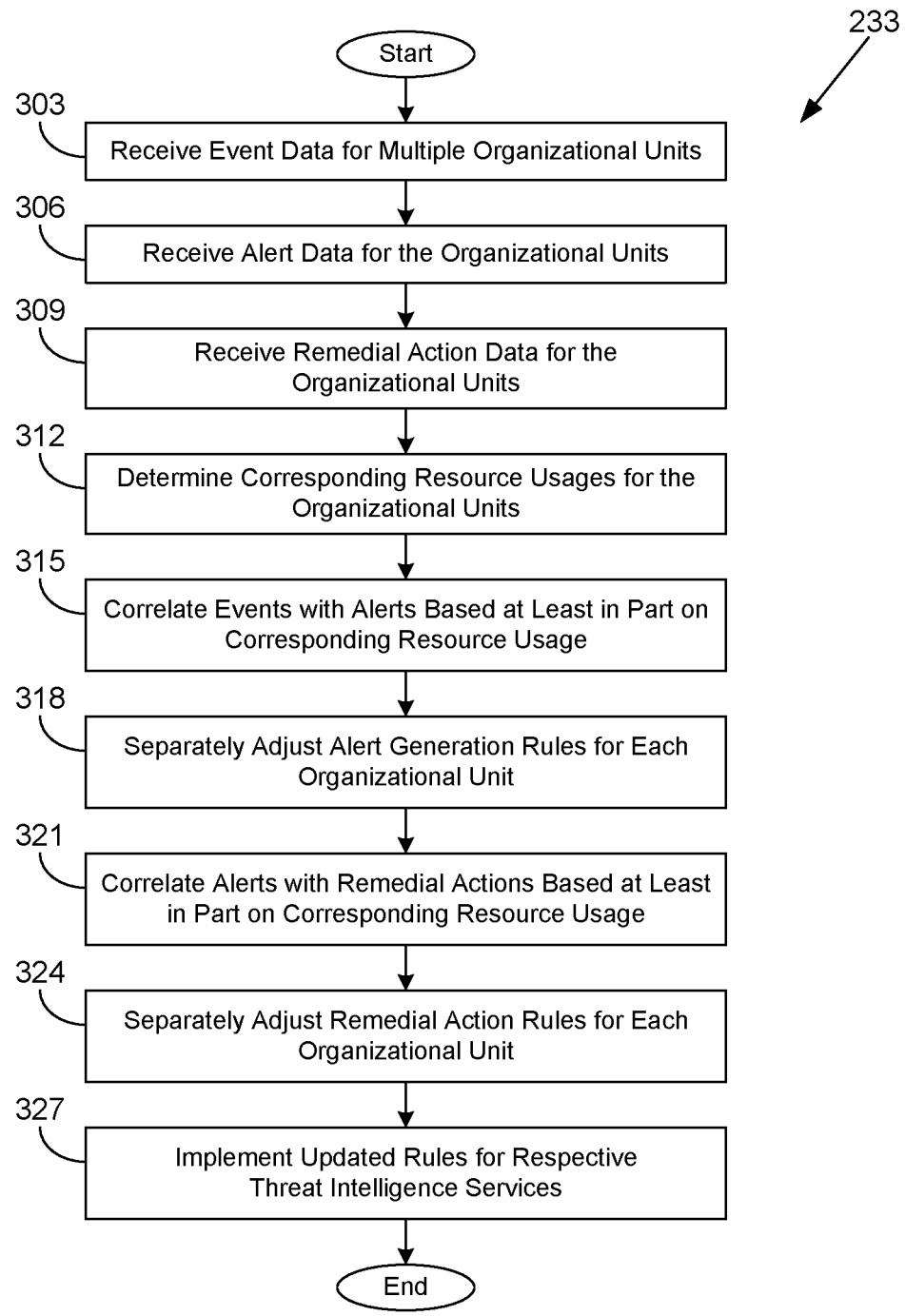
FIGS. 3 and 4 are flowcharts illustrating examples of functionality implemented as portions of a correlation and decision engine executed in a security environment in the networked environment of FIG. 2 according to various embodiments of the present disclosure.

Referring next to FIG. 3, shown is a flowchart that provides one example of the operation of a portion of the correlation and decision engine 233 according to various embodiments. It is understood that the flowchart of FIG. 3 provides merely an example of the many different types of functional arrangements that may be employed to implement the operation of the portion of the correlation and decision engine 233 as described herein. As an alternative, the flowchart of FIG. 3 may be viewed as depicting an example of elements of a method implemented in the security environment 203 (FIG. 2) according to one or more embodiments.

Beginning with box 303, the correlation and decision engine 233 receives event data 236 (FIG. 2) for multiple organizational units. The event data 236 may pertain to a past time period and may be generated by multiple network monitoring systems 221 (FIG. 2) from many different monitoring services 224 (FIG. 2). In box 306, the correlation and decision engine 233 receives alert data 239 (FIG. 2) for the organizational units. The alert data 239 may be generated by multiple instances of a threat intelligence service 227 (FIG. 2), and in some cases, by multiple different types of threat intelligence services 227. In box 309, the correlation and decision engine 233 receives remedial action data 242 (FIG. 2) for the organizational units. The remedial action data 242 may be generated by multiple instances of a threat intelligence service 227 (FIG. 2), and in some cases, by multiple different types of threat intelligence services 227.

In box 312, the correlation and decision engine 233 determines corresponding resource usages for the individual organizational units from the resource usage data 245 (FIG. 2). This indicates the types of systems, services, and networks that are utilized by each individual organizational unit.

In box 315, the correlation and decision engine 233 correlates detected events with generated alerts based at least in part on the corresponding resource usage. In other words, the correlation and decision engine 233 is able to correlate event detection with alert generation for organizational units that have similar resource usage characteristics. It is noted that the alert generation for given events may differ across organizational units due to differences in event detection rules 251 (FIG. 2) and alert generation rules 254 (FIG. 2). Also, the types of events and network activity may differ across organizational units. In performing the correlation, the correlation and decision engine 233 may isolate a subset of the event data 236 and/or the alert data 239 that is associated with a particular organizational unit before performing the correlation with respect to that subset of data.

In box 318, the correlation and decision engine 233 separately adjusts the alert generation rules 254 for the instance of the threat intelligence service 227 for each individual organizational unit. For example, the correlation and decision engine 233 may determine that the types of alerts generated for certain types of events meets a threshold for high frequency among similarly situated organizational units having similar resource usage. In such situations, the correlation and decision engine 233 may adjust the alert generation rule 254 so that such alerts have a lower priority or severity level because they occur so frequently.

Alternatively, the correlation and decision engine 233 may determine that the types of alerts generated for certain types of events meets a threshold for low frequency among similarly situated organizational units having similar resource usage. In such situations, the correlation and decision engine 233 may adjust the alert generation rule 254 so that such alerts have a higher priority or severity level because they occur so infrequently. As a result of the separate adjustment, different organizational units may have alerts generated with different priority or severity levels given the same combination of events. Some rules may be specific to particular organizational units, and different baseline thresholds may be applied to different types of organizational units. In some cases, severity levels may increase over time, and increasing levels of severity may be particular to certain organizational units.

In box 321, the correlation and decision engine 233 correlates generated alerts with generated or recommended remedial actions based at least in part on the corresponding resource usage. In other words, the correlation and decision engine 233 is able to correlate alert generation with remedial actions for organizational units that have similar resource usage characteristics. It is noted that the remedial action recommendation or generation for given events may differ across organizational units due to differences in alert generation rules 254 or remedial action rules 257 (FIG. 2). Also, the types of events and network activity may differ across organizational units.

In box 324, the correlation and decision engine 233 separately adjusts the remedial action rules 257 for the instance of the threat intelligence service 227 for each individual organizational unit. Also, the correlation and decision engine 233 may update the alert generation rules 254 based upon the correlated remedial actions. For example, a severity level of a certain type of alert may be increased if a relatively significant remedial action is usually performed for that type of alert. By contrast, the severity level of a certain type of alert may be decreased if no remedial action is usually performed for that type of alert.

In box 327, the correlation and decision engine 233 implements updated event detection rules 251, alert generation rules 254, and/or remedial action rules 257 for the respective threat intelligence services 227. The correlation and decision engine 233 may also update the machine learning model 260 (FIG. 2). Thereafter, the operation of the portion of the correlation and decision engine 233 ends.

Figure 4:
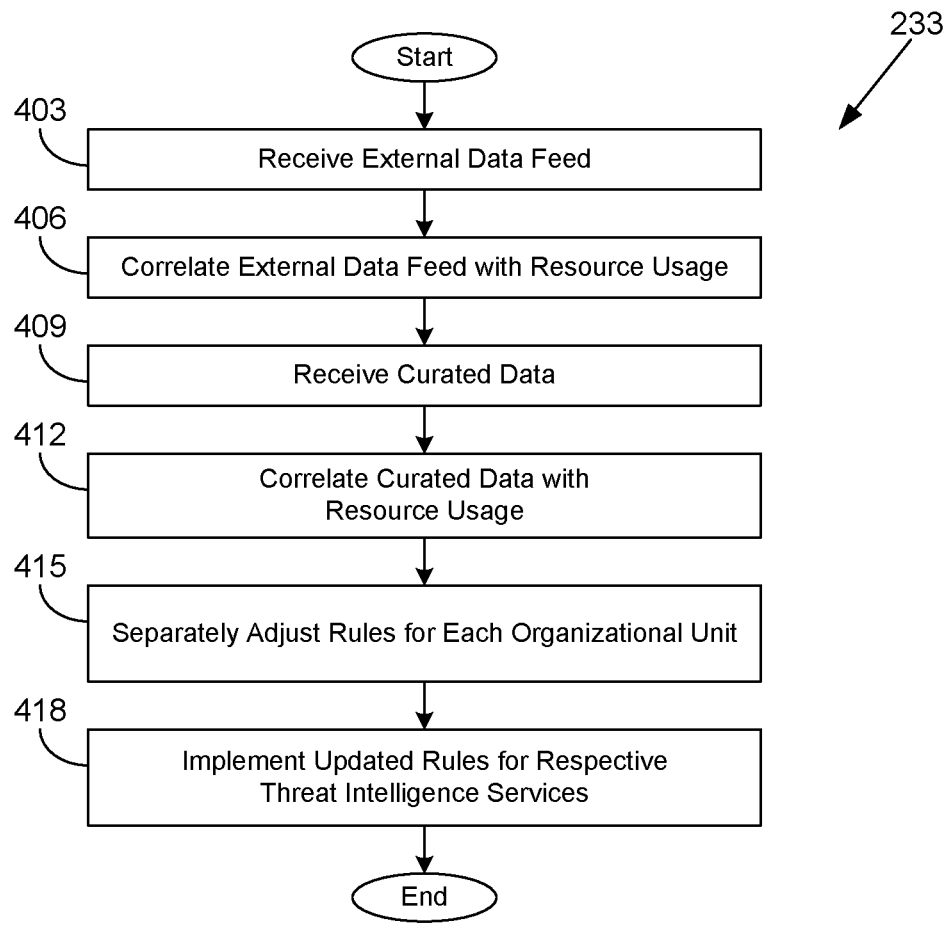

Moving on to FIG. 4, shown is a flowchart that provides one example of the operation of another portion of the correlation and decision engine 233 according to various embodiments. It is understood that the flowchart of FIG. 4 provides merely an example of the many different types of functional arrangements that may be employed to implement the operation of the portion of the correlation and decision engine 233 as described herein. As an alternative, the flowchart of FIG. 4 may be viewed as depicting an example of elements of a method implemented in the security environment 203 (FIG. 2) according to one or more embodiments.

Beginning with box 403, the correlation and decision engine 233 receives one or more external data feeds 248 (FIG. 2) from one or more third party services. In box 406, the correlation and decision engine 233 correlates the contents of the external data feed 248 (e.g., the events, alerts, and/or remedial actions relating to the external data feed 248) with resource usage in view of the resource usage data 245 (FIG. 2) and other baseline data for multiple organizational units. In some cases, an external data feed 248 may include externally defined priority levels for alerts.

In box 409, the correlation and decision engine 233 may optionally receive automatically or manually curated data. The curated data may be an instruction to adjust a rule, an instruction to ignore a certain event or alert, an instruction to perform a remedial action or a notation that a remedial action has been performed, and/or other entered data from security administrators of one or more organizational units.

In box 412, the correlation and decision engine 233 may correlate the curated data with resource usage of the organizational unit to which it pertains. In box 415, the correlation and decision engine 233 may separately adjust the event detection rules 251 (FIG. 2), the alert generation rules 254 (FIG. 2), and/or the remedial action rules 257 (FIG. 2) for each individual organizational unit, based at least in part on the resource usage of the corresponding organizational unit. For example, alert generation rules 254 may be adjusted based at least in part on an externally defined priority level for a given alert. In box 418, the correlation and decision engine 233 implements the updated rules for the respective threat intelligence services 227 (FIG. 2) of the respective organizational units. Thereafter, the operation of the portion of the correlation and decision engine 233 ends.

Figure 5:
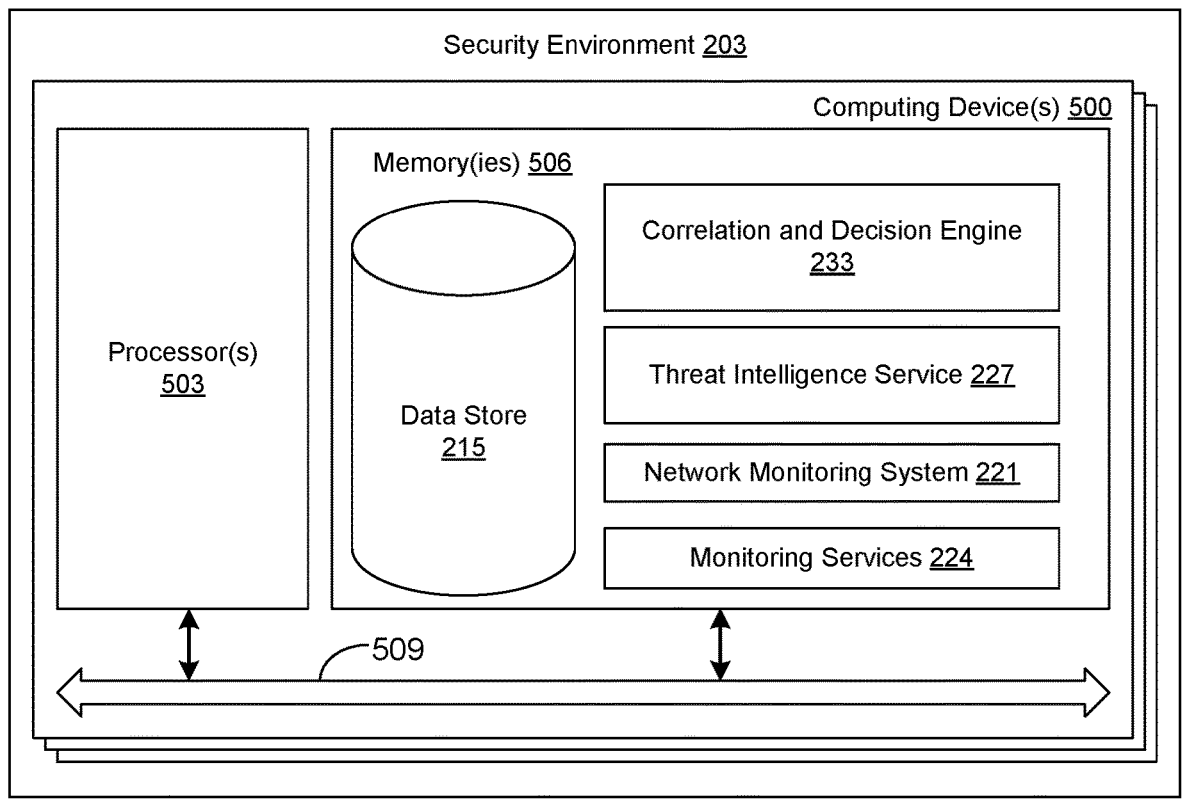
FIG. 5 is a schematic block diagram that provides one example illustration of a security environment employed in the networked environment of FIG. 2 according to various embodiments of the present disclosure.

With reference to FIG. 5, shown is a schematic block diagram of the security environment 203 according to an embodiment of the present disclosure. The security environment 203 includes one or more computing devices 500. Each computing device 500 includes at least one processor circuit, for example, having a processor 503 and a memory 506, both of which are coupled to a local interface 509. To this end, each computing device 500 may comprise, for example, at least one server computer or like device. The local interface 509 may comprise, for example, a data bus with an accompanying address/control bus or other bus structure as can be appreciated.

Stored in the memory 506 are both data and several components that are executable by the processor 503. In particular, stored in the memory 506 and executable by the processor 503 are the correlation and decision engine 233, the threat intelligence service 227, the network monitoring system 221, the monitoring services 224, and potentially other applications. Also stored in the memory 506 may be a data store 215 and other data. In addition, an operating system may be stored in the memory 506 and executable by the processor 503.

It is understood that there may be other applications that are stored in the memory 506 and are executable by the processor 503 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 506 and are executable by the processor 503. In this respect, the term "executable" means a program file that is in a form that can ultimately be run by the processor 503. Examples of executable programs may be, for example, a compiled program that can be translated into machine code in a format that can be loaded into a random access portion of the memory 506 and run by the processor 503, source code that may be expressed in proper format such as object code that is capable of being loaded into a random access portion of the memory 506 and executed by the processor 503, or source code that may be interpreted by another executable program to generate instructions in a random access portion of the memory 506 to be executed by the processor 503, etc. An executable program may be stored in any portion or component of the memory 506 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 506 is defined herein as including both volatile and nonvolatile memory and data storage components. Volatile components are those that do not retain data values upon loss of power. Nonvolatile components are those that retain data upon a loss of power. Thus, the memory 506 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 503 may represent multiple processors 503 and/or multiple processor cores and the memory 506 may represent multiple memories 506 that operate in parallel processing circuits, respectively. In such a case, the local interface 509 may be an appropriate network that facilitates communication between any two of the multiple processors 503, between any processor 503 and any of the memories 506, or between any two of the memories 506, etc. The local interface 509 may comprise additional systems designed to coordinate this communication, including, for example, performing load balancing. The processor 503 may be of electrical or of some other available construction.

Although the correlation and decision engine 233, the threat intelligence service 227, the network monitoring system 221, the monitoring services 224, and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3 and 4 show the functionality and operation of an implementation of portions of the correlation and decision engine 233. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 503 in a computer system or other system. The machine code may be converted from the source code, etc. If embodied in hardware, each block may represent a circuit or a number of interconnected circuits to implement the specified logical function(s).

Although the flowcharts of FIGS. 3 and 4 show a specific order of execution, it is understood that the order of execution may differ from that which is depicted. For example, the order of execution of two or more blocks may be scrambled relative to the order shown. Also, two or more blocks shown in succession in FIGS. 3 and 4 may be executed concurrently or with partial concurrence. Further, in some embodiments, one or more of the blocks shown in FIGS. 3 and 4 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the correlation and decision engine 233, the threat intelligence service 227, the network monitoring system 221, and the monitoring services 224, that comprises software or code can be embodied in any non-transitory computer-readable medium for use by or in connection with an instruction execution system such as, for example, a processor 503 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the correlation and decision engine 233, the threat intelligence service 227, the network monitoring system 221, and the monitoring services 224, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 500, or in multiple computing devices 500 in the same security environment 203.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying a program executable in at least one computing device, wherein when executed the program causes the at least one computing device to at least:
   receive event data indicating a plurality of events generated by a plurality of monitoring services for a plurality of organizational units;
   receive alert data indicating a plurality of alerts generated by a plurality of instances of a threat intelligence service for individual ones of the plurality of organizational units;
   correlate the plurality of events with the plurality of alerts based at least in part on a corresponding resource usage associated with the individual ones of the plurality of organizational units;
   for individual ones of the plurality of instances of the threat intelligence service, separately adjust at least one rule with respect to at least one event based at least in part on a frequency threshold being met by a corresponding frequency of at least one of the plurality of alerts, the at least one of the plurality of alerts being associated with the at least one event, wherein the separate adjustment of the at least one rule causes a change to a severity level of a particular alert of the at least one of the plurality of alerts for a first instance of the plurality of instances of the threat intelligence service, thereby causing the severity level to differ from a severity level of the particular alert for a second instance of the plurality of instances of the threat intelligence service; and
   wherein the separate adjustment of the at least one rule further causes a different particular alert of the at least one of the plurality of alerts to be generated for the first instance of the plurality of instances of the threat intelligence service and not generated for the second instance of the plurality of instances of the threat intelligence service.

2. The non-transitory computer-readable medium of claim 1, wherein when executed the program further causes the at least one computing device to at least:
   receive remedial action data indicating a plurality of remedial actions taken in response to the plurality of alerts for the individual ones of the plurality of organizational units;

correlate the plurality of remedial actions with the plurality of alerts based at least in part on the corresponding resource usage associated with the individual ones of the plurality of organizational units; and for the individual ones of the plurality of instances of the threat intelligence service, separately adjust at least one other rule with respect to generating a remedial action for another particular alert based at least in part on the correlation of the plurality of remedial actions with the plurality of alerts and the corresponding resource usage.

3. The non-transitory computer-readable medium of claim 2, wherein the at least one other rule assigns a respective severity level to individual ones of the plurality of alerts.

4. The non-transitory computer-readable medium of claim 2, wherein when executed the program further causes the at least one computing device to at least generate at least one rule for recommending a particular remedial action to respond to the other particular alert based at least upon correlating the plurality of remedial actions taken with respect to the plurality of alerts.

5. The non-transitory computer-readable medium of claim 1, wherein the at least one rule assigns a priority to the at least one of the plurality of alerts.

6. A system, comprising:
at least one computing device; and
a correlation and decision engine executable in the at least one computing device, wherein when executed the correlation and decision engine causes the at least one computing device to at least:
correlate event data generated by a plurality of monitoring services with a plurality of alerts generated by a plurality of threat intelligence services;
adjust at least one rule of at least one of the plurality of threat intelligence services with respect to at least one event based at least in part on a frequency threshold being met by a corresponding frequency of at least one of the plurality of alerts, the at least one of the plurality of alerts being associated with the at least one event, wherein the adjustment of the at least one rule causes a change to a severity level of a particular alert of the at least one of the plurality of alerts for the at least one of the plurality of threat intelligence services, thereby causing the severity level to differ from a severity level of the particular alert for a different threat intelligent service of the plurality of threat intelligence services; and
wherein the adjustment of the at least one rule further causes a different particular alert of the at least one of the plurality of alerts to be generated for the at least one of the plurality of threat intelligence services and not generated for the different threat intelligence service of the plurality of threat intelligence services.

7. The system of claim 6, wherein the at least one rule assigns a priority to the at least one of the plurality of alerts.

8. The system of claim 6, wherein when executed the correlation and decision engine further causes the at least one computing device to at least isolate a subset of the event data that is associated with a particular organizational unit of a plurality of organizational units before performing the correlation with respect to the subset of the event data.

9. The system of claim 6, wherein when executed the correlation and decision engine further causes the at least one computing device to at least:
correlate a plurality of remedial actions taken with respect to the plurality of alerts; and adjust at least one other rule of the threat intelligence service with respect to the plurality of alerts based at least in part on the plurality of remedial actions.

10. The system of claim 9, wherein the at least one other rule assigns a respective severity level to individual ones of the plurality of alerts.

11. The system of claim 6, wherein when executed the correlation and decision engine further causes the at least one computing device to at least:
correlate a plurality of remedial actions taken with respect to the plurality of alerts; and
generate at least one rule for recommending a particular remedial action to respond to a particular alert based at least upon correlating the plurality of remedial actions taken with respect to the plurality of alerts.

12. The system of claim 6, wherein the at least one rule is specific to a particular organizational unit of a plurality of organizational units supported by the plurality of threat intelligence services.

13. The system of claim 12, wherein when executed the correlation and decision engine further causes the at least one computing device to at least adjust the at least one rule based at least in part on a resource usage classification associated with the particular organizational unit.

14. The system of claim 6, wherein when executed the correlation and decision engine further causes the at least one computing device to at least:
obtain an external data feed indicating an externally defined priority level associated with the at least one event; and
adjust the at least one rule of the threat intelligence service with respect to at least one event based at least in part on the externally defined priority level.

15. A method, comprising:
analyzing, via at least one of one or more computing devices, data describing resource usage for individual ones of a plurality of organizational units; and
adjusting, via at least one of the one or more computing devices, at least one rule for generating at least one alert from event data for the individual ones of the plurality of organizational units in a threat intelligence service based at least in part on the resource usage corresponding to the individual ones of the plurality of organizational units, wherein the at least one rule is adjusted differently for the individual ones of the plurality of organizational units so that the adjustment of the at least one rule for a first organizational unit of the plurality of organizational units causes a change to a severity level of a particular alert of the at least one alert, thereby causing the severity level to differ from a severity level of the particular alert for a second organizational unit of the plurality of organizational units, wherein adjusting the at least one rule further causes a different particular alert of the at least one alert to be generated for the first organizational unit and not generated for the second organizational unit.

16. The method of claim 15, wherein analyzing the data describing resource usage further comprises correlating, via at least one of the one or more computing devices, the resource usage with generation of the at least one alert across the plurality of organizational units.

17. The method of claim 15, wherein analyzing the data describing resource usage further comprises correlating, via at least one of the one or more computing devices, the resource usage with at least one curated rule for generating the at least one alert.

18. The method of claim 15, further comprising:
correlating, via at least one of the one or more computing devices, data generated by a plurality of monitoring services with a plurality of alerts generated by the threat intelligence service across the plurality of organizational units; and
wherein the at least one rule is further adjusted based at least in part on a frequency threshold being met by a corresponding frequency of the at least one alert in the data generated by the plurality of monitoring services.

19. The method of claim 15, further comprising:
correlating, via at least one of the one or more computing devices, a plurality of remedial actions taken with respect to a plurality of alerts through the threat intelligence service; and
generating at least one rule for recommending a particular remedial action to respond to a particular alert based at least upon correlating the plurality of remedial actions taken with respect to the plurality of alerts.

20. The method of claim 15, further comprising:
receiving, via at least one of the one or more computing devices, a manual modification to the at least one rule for the first organizational unit; and
automatically adjusting, via at least one of the one or more computing devices, the at least one rule for generating the at least one alert from the event data for a third organizational unit of the plurality of organizational units based at least in part on the manual modification and a resource usage similarity between the first organizational unit and the third organizational unit.

* * * * *